US009654475B2

(12) United States Patent
Zhang et al.

(10) Patent No.: US 9,654,475 B2
(45) Date of Patent: May 16, 2017

(54) CLIENT BEHAVIOR CONTROL IN ADAPTIVE STREAMING FILE

(71) Applicant: Futurewei Technologies, Inc., Plano, TX (US)

(72) Inventors: Shaobo Zhang, Shenzen (CN); Xin Wang, Shenzen (CN); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/595,056

(22) Filed: Jan. 12, 2015

(65) Prior Publication Data

US 2015/0200944 A1    Jul. 16, 2015

Related U.S. Application Data

(60) Provisional application No. 61/926,073, filed on Jan. 10, 2014.

(51) Int. Cl.
*G06F 7/04*     (2006.01)
*G06F 15/16*    (2006.01)
(Continued)

(52) U.S. Cl.
CPC .......... *H04L 63/10* (2013.01); *H04L 65/4084* (2013.01); *H04L 65/605* (2013.01);
(Continued)

(58) Field of Classification Search
CPC ....... H04L 63/102; H04L 63/08; H04L 63/10; H04W 12/06; H04W 12/08
(Continued)

(56) References Cited

U.S. PATENT DOCUMENTS

2009/0240768 A1*  9/2009  Fernandez ............. G06Q 30/02
                                                        709/203
2010/0274872 A1   10/2010  Harrang et al.
(Continued)

FOREIGN PATENT DOCUMENTS

WO            02084980 A1     10/2002

OTHER PUBLICATIONS

International Search ReportDated Apr. 17, 2015; 8 pages; PCT/US 15/11067.
(Continued)

*Primary Examiner* — Kambiz Zand
*Assistant Examiner* — Stephen Sanders
(74) *Attorney, Agent, or Firm* — Conley Rose, P.C.

(57) ABSTRACT

A computer-implemented method for controlling adaptive streaming media access includes requesting a first portion of media content from a content server and requesting authorization corresponding to a second portion of media content from an authorization server. The method further includes submitting evidence to the authorization server that the first portion of media content has been received by a client device and receiving a representation of authorization to access the second portion of media content in response to the evidence complying with a requirement. The method also includes requesting the second portion of media content from the content server, presenting the representation of authorization to the content server, and receiving the second portion of media content in response to the representation of authorization being accepted by the content server. The method can effectively control client behavior to prevent the client from skipping past required media content, such as a commercial advertisement.

20 Claims, 6 Drawing Sheets

(51) Int. Cl.
*G06F 17/30* (2006.01)
*H04L 29/06* (2006.01)
*H04L 29/08* (2006.01)
*H04N 21/24* (2011.01)
*H04N 21/258* (2011.01)
*H04N 21/6543* (2011.01)

(52) U.S. Cl.
CPC .............. *H04L 67/02* (2013.01); *H04N 21/24* (2013.01); *H04N 21/258* (2013.01); *H04N 21/6543* (2013.01)

(58) Field of Classification Search
USPC .......................................................... 726/4
See application file for complete search history.

(56) References Cited

U.S. PATENT DOCUMENTS

| | | | |
|---|---|---|---|
| 2012/0158988 A1* | 6/2012 | Fatehpuria | H04L 65/4084 709/234 |
| 2012/0324490 A1* | 12/2012 | Hwang | H04N 21/2393 725/9 |
| 2013/0042100 A1 | 2/2013 | Bouazizi et al. | |
| 2013/0073384 A1 | 3/2013 | Qiu | |
| 2013/0219178 A1 | 8/2013 | Xiques et al. | |
| 2013/0290493 A1 | 10/2013 | Oyman et al. | |
| 2014/0013375 A1 | 1/2014 | Giladi | |

OTHER PUBLICATIONS

Foreign Communication From a Counterpart Application, European Application No. 15735605.6, Extended European Search Report dated Aug. 8, 2016, 10 pages.

* cited by examiner

CLIENT BEHAVIOR CONTROL IN ADAPTIVE STREAMING FILE

CROSS-REFERENCE TO RELATED APPLICATIONS

This application claims the benefit of U.S. Provisional Application Ser. No. 61/926,073, filed on Jan. 10, 2014, which is incorporated by reference herein.

TECHNICAL FIELD

This description relates generally to streaming data delivery, and more particularly to controlling client behavior regarding adaptive steaming data delivery in a communication network.

BACKGROUND

Streaming media over networks, in particular over the Internet, using the Hypertext Transfer Protocol (HTTP) has become a popular approach for delivering of multimedia content. HTTP streaming makes use of existing content delivery networks, or content distribution networks (CDNs), large distributed systems of servers deployed in multiple data centers across the Internet, which facilitates relatively high availability, high performance, cost-effective delivery of multimedia content to end-users.

In HTTP streaming schemes, the client system manages the streaming activity, eliminating the need for the corresponding server system to maintain a session state regarding the streaming activity, and thus reducing required server overhead. Owing to the popularity of HTTP streaming, several proprietary streaming platforms have been developed to support HTTP streaming.

In addition, in an attempt to provide an improved and standardized methodology for adaptively streaming media over a network, the Moving Picture Expert Group (MPEG) has defined Dynamic Adaptive Streaming over HTTP (DASH), or MPEG-DASH. A joint technical committee of the International Organization for Standardization (ISO) and the International Electrotechnical Commission (IEC) has since incorporated the MPEG-DASH specification in the ISO/IEC 23009-1 open standard. The international standard promotes interoperability between clients and servers from various vendors.

In MPEG-DASH, an audio/video multimedia data stream is divided, or partitioned, into multiple pieces, or periods. Each period can be further divided into multiple segments, which can be subdivided into subsegments. The periods and segments, along with their locations and other relevant details, are described in a media presentation description (MPD) file. The client system requests segments from the server system using HTTP, and then splices together or sequentially presents the pieces of media streams contained in or files. Thus, the client system controls delivery of the media content.

An MPEG-DASH presentation typically includes alternative representations, for example, multiple versions of multimedia files for each segment with differing resolutions and/or bit rates. This allows the client system to dynamically select the most appropriate representation based on environmental conditions, such as network conditions, device capabilities and user preferences. This scheme enables adaptive bitrate streaming throughout the presentation, as the client may switch between versions as necessary to adapt to changing network, CPU and buffer status. Alternative representations further allow the client to choose among various adaptation sets to respond to user input, such as enabling or disabling subtitles, or selecting a language.

Insertion of commercial advertisements in streaming media presentations has become an important revenue source for online streaming providers. For example, advertisements can be inserted as a period at the beginning (pre-roll) or in the middle of a presentation (mid-roll). From the perspective of the advertiser, it is highly desired that the user view the subsequent media content only after viewing the inserted advertisement(s). Thus, from the perspective of the online streaming provider, it generally is important to ensure that the advertisement period is presented by the client system to the user, or viewer, before the subsequent media content is presented.

However, since MPEG-DASH client systems typically run in an open environment, hardware or software platform, and are implemented as an open-source package, the client system can easily be modified to behave in a different manner than that intended by the media provider, or that specified in the MPD. Thus, in general, the client system can be configured to omit part of the HTTP media content of a streamed presentation, allowing the user to skip a specified portion—typically an advertisement—and thus interfere with the ad-sponsored business model.

As a result, controlling client system behavior has become a concern in HTTP streaming, including MPEG-DASH-based technology and related applications.

SUMMARY

According to one embodiment of the present invention, a method for controlling adaptive streaming media access includes requesting a first portion of media content from a content server, and submitting evidence to an authorization server that the first portion of media content has been received or processed by a client device. The method also includes receiving a representation of authorization to access the second portion of media content in response to the evidence complying with a requirement, requesting the second portion of media content from the content server, and presenting the representation of authorization to the content server.

According to another embodiment of the present invention, a method for controlling adaptive streaming media access includes receiving an authorization request corresponding to a second portion of media content from a client device, receiving evidence from the client device that a first portion of media content has been received by the client device, and sending a representation of authorization to access the second portion of media content to the client device in response to the evidence complying with a requirement.

According to yet another embodiment of the present invention, an apparatus for controlling adaptive streaming media access includes an authorization server that receives an authorization request corresponding to a second portion of media content from a client device. The authorization server also receives evidence from the client device that a first portion of media content has been received by the client device, and sends a representation of authorization to access the second portion of media content to the client device in response to the evidence complying with a requirement. A content server receives a first request from the client device for the first portion of media content and sends the first portion of media content to the client device. The content server also receives a second request from the client device for the second portion of media content and receives the representation of authorization to access the second portion of media content from the client device. The content server further accepts the representation of authorization and sends the second portion of media content to the client device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
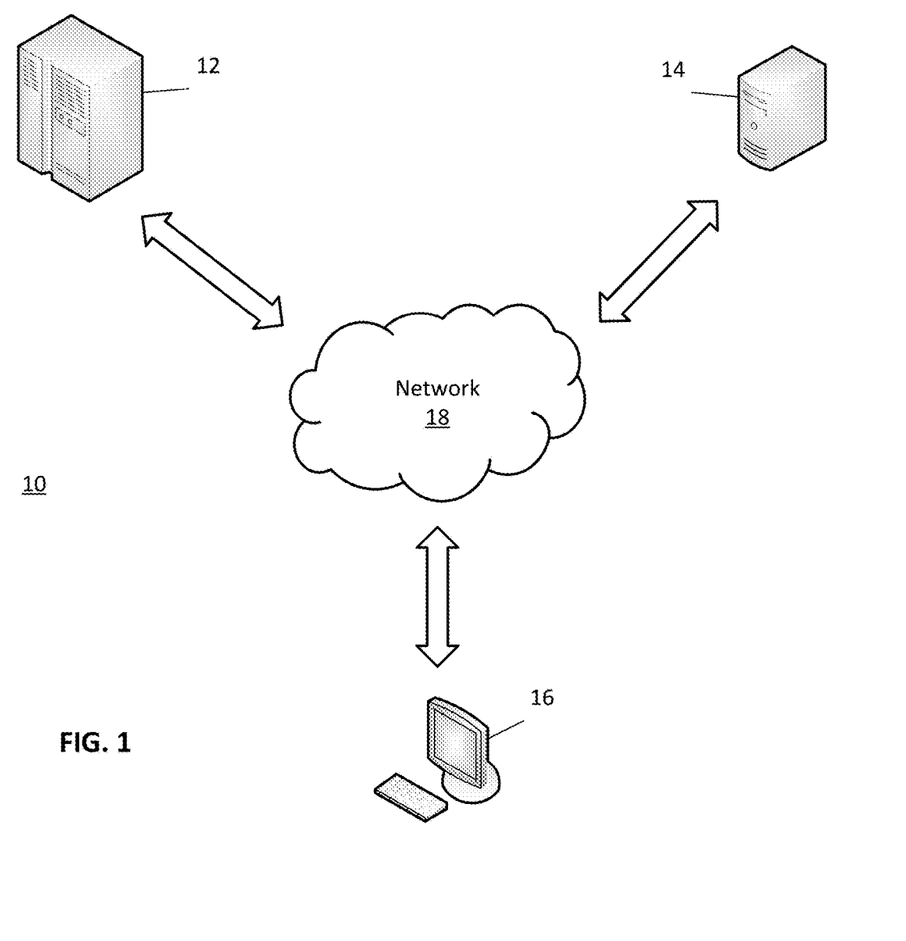
FIG. 1 is a schematic view illustrating an adaptive media streaming system in accordance with an embodiment of the present invention.

An embodiment of the present invention is shown in FIG. 1, which illustrates an exemplary adaptive media streaming system 10 that employs an access authorization process in order to prevent a client system from omitting a specified portion of the media content in an online streaming presentation. The adaptive media streaming system 10 establishes a dependency relationship, for example, between a specified portion of the media content and another portion of the media content.

The dependency relationship between content segments may impose a requirement, for example, that the specified portion of the media content be received, processed, decoded, or displayed by a client before another portion in another period can be accessed by the client. In alternative embodiments, the specified portion and the other portion of media content are delivered in separate online or offline streaming presentations or sessions.

The adaptive media streaming system 10 includes a content server 12, an authorization server 14, and a client device 16, all of which are coupled by a communication network 18. The content server 12 is an adaptive streaming media source that contains multimedia content for online streaming over the network 18 to content users, including the client device 16. For example, the content server 12 can store video and audio files to provide streaming music videos, movies, television shows, or the like to content users or consumers. The content server 12 may pertain to a media content provider, such as an online streaming provider, media service provider or other media company or organization.

In some embodiments, the content server 12 is implemented on a single computing device, such as a network server or workstation. In other embodiments, the content server 12 is implemented on multiple computing devices, such as a distributed system of network servers, including, for example, a content delivery network, or content distribution network (CDN). For example, the media content may be replicated on network servers at diverse geographic locations.

The authorization server 14 provides permission, or authorization, to the client device 16 by way of the network 18 to access media content contained in the content server 12. For example, the authorization server 14 provides the client device 16 an access token authorizing access to the main portion of the requested media content, such as a movie file, based on the client device evidencing receipt, processing or presentation of a specified portion of the media content, such as a sponsor advertisement, copyright claim, payment notice, warning, or the like.

In some embodiments, the authorization server 14 is implemented on a single computing device, such as a network server or workstation. In other embodiments, the authorization server 14 or its component functions can be implemented on multiple computing devices, such as a distributed system of network servers, including, for example, a content delivery network, or content distribution network (CDN). For example, authorization for access to dependent media content may be provided by a different server than authorization for control of buffering pace. Further, in an alternative embodiment, the content server 12 and the authorization server 14 can be implemented on the same computing device.

The client device 16, for example, a browser-based or stand-alone streaming video player, requests media content from the content server 12. The client device requests authorization regarding the media content contained in the content server 12 from the authorization server 14. The client device 16 provides evidence of receipt, processing or presentation of specified media content to the authorization server 14, and receives authorization, for example, in the form of an access token, from the authorization sever 14 if the evidence is accurate, correct or acceptable.

The content server 12, the authorization server 14 and the client device 16 are communicatively interconnected by way of the communication network 18. In various embodiments, the communication network 18 can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

The adaptive media streaming system 10 offers advantages, for example, effectively controlling client behavior to prevent clients from selectively skipping media content, such as commercial advertisements, copyright claim, payment notice, warning, or the like.

Figure 2:
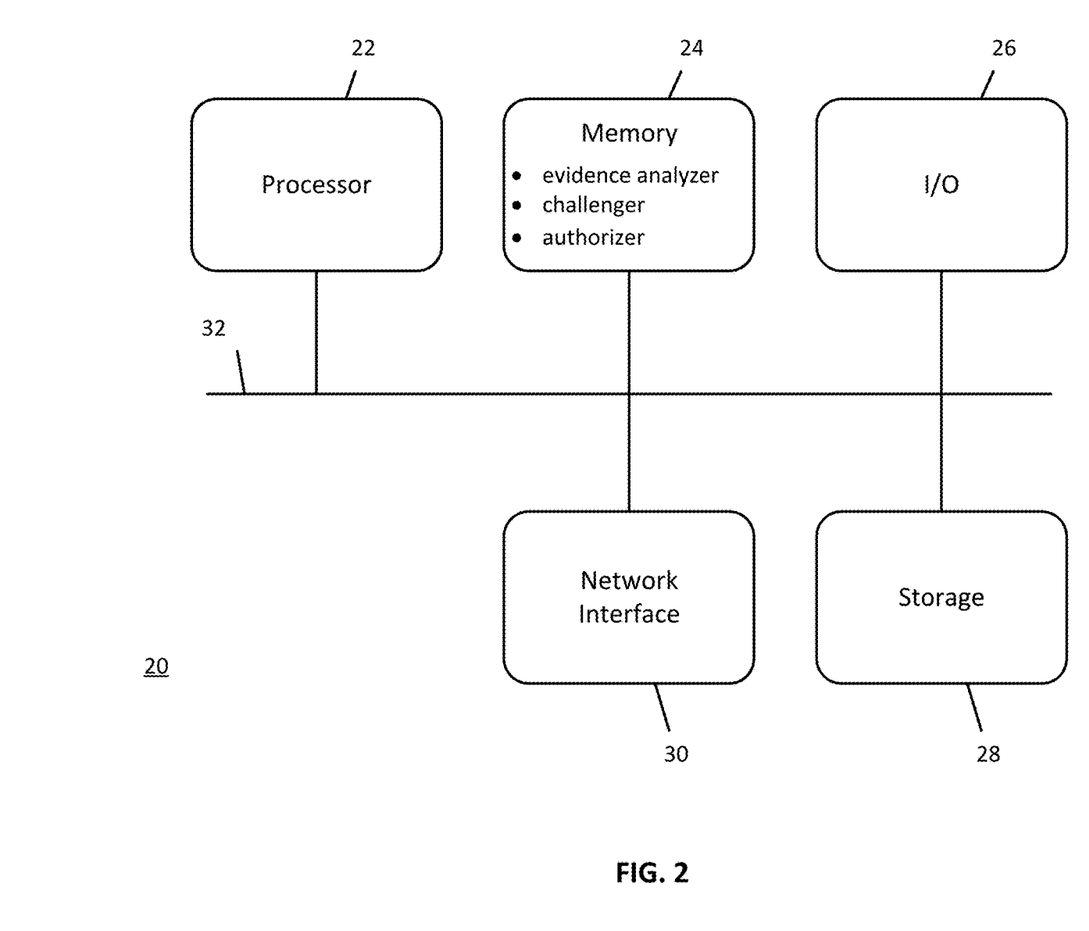
FIG. 2 is a schematic view depicting an exemplary computing system that can be employed in the adaptive media streaming system of FIG. 1.

As illustrated in FIG. 2, an exemplary computing device 20 that can be employed in the adaptive media streaming system 10 of FIG. 1 includes a processor 22, a memory 24, an input/output device (I/O) 26 storage 28 and a network interface 30. The various components of the computing device 20 are coupled by a local data link 32, which in various embodiments incorporates, for example, an address bus, a data bus, a serial bus, a parallel bus, or any combination of these.

The computing device 20 communicates information to and requests input from the user or other devices by way of the I/O 26, which in various embodiments incorporates, for example, an interactive, menu-driven, visual display-based user interface, or graphical user interface (GUI), a pointing device, such as a, with which the user may interactively input information using direct manipulation of the GUI. In some embodiments, direct manipulation includes the use of an alphanumeric input device, such as a keyboard, a pointing device, such as a mouse, a touchpad, a trackball, a joystick or a stylus, to select from a variety of windows, icons and selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of an alphanumeric input device, a pointing device, buttons or keys, for example, using direct voice input.

The computing device 20 is be coupled to the communication network 18 by way of the network interface 30, which in various embodiments incorporates, for example, any combination of devices—as well as any associated software or firmware—configured to couple processor-based systems, including modems, access points, network interface cards, LAN or WAN interfaces, wireless or optical interfaces and the like, along with any associated transmission protocols, as may be desired or required by the design.

The computing device 20 can be used, for example, to implement the functions of the content server 12, the authorization server 14 or the client device 16 of FIG. 1. In various embodiments, the computing device 20 can include, for example, a server, a controller, a workstation, a mainframe computer, personal computer (PC), a note pad, a computing tablet, a personal digital assistant (PDA), a smart phone, or the like. Programming code, such as source code, object code or executable code, stored on a computer-readable medium, such as the storage 28 or a peripheral storage component coupled to the computing device 20, can be loaded into the memory 24 and executed by the processor 22 in order to perform the functions of the adaptive media streaming system 10. For example, as shown in FIG. 2, the memory 24 can include an evidence analyzer module, a challenger module and an authorizer module.

Figure 3:
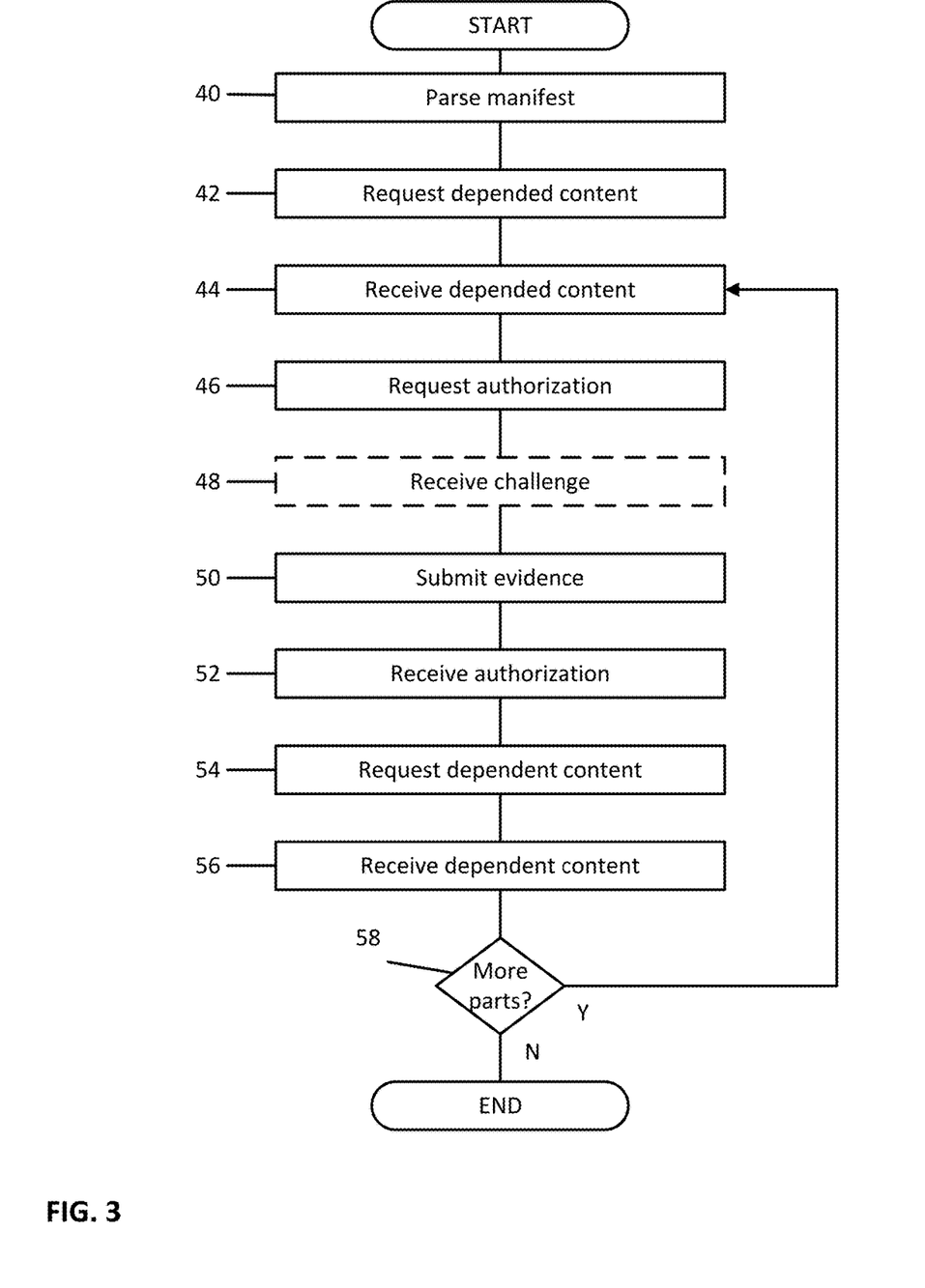
FIG. 3 is a flowchart representing a method of controlling adaptive streaming media access in accordance with an embodiment of the present invention.

Referring now to FIG. 3, an exemplary process flow is illustrated that may be performed, for example, by the client device 16 in the adaptive media streaming system 10 of FIG. 1 to implement the method described in this disclosure for employing an access authorization process in order to prevent a client system from omitting a specified portion of the media content in an online streaming presentation. The process begins at block 40, where a manifest of the available content describing or defining adaptive streaming media content is parsed.

For example, in an embodiment, the manifest includes a media presentation description (MPD) in accordance with the Moving Picture Expert Group (MPEG) specification of Dynamic Adaptive Streaming over HTTP (DASH), or MPEG-DASH. The MPD is an extensible markup language (XML)-formatted document that describes the media presentation, providing streaming media segment information, such as timing and resource identifiers (uniform resource locators, URLs), possibly combined with a byte range, and context, as well as media characteristics, such as video resolution and bit rates.

A descriptor can be defined in the MPD at a period level, such as the exemplary descriptor shown below, containing, for example, one or more dependency relationships (access Dependency), an authorization server (authServerURL), and an authorization scheme (schemeId):

```
<!-- Descriptor -->
<xs:complexType name="AuthorizedAccessType">
    <xs:complexContent>
        <xs:extension name="DescriptorType">
            <xs:attribute name="authServerURL" type="xs:anyURI"
                use="optional"/>
            <xs:attribute name="schemeId" type="xs:anyURI"
                use="required"/>
            <xs:attribute name="accessDependency" type="xs:string"/>
        </xs:extension>
    </xs:complextContent>
</xs:complexType>
```

Authorization schemes can include, for example, HTTP Authentication, Open Multimedia Applications Platform (OMAP), or 3rd Generation Partnership Project (3GPP) Authentication.

An MPEG-DASH presentation typically is divided, or partitioned, into multiple periods and segments. A period may correspond to primary content—for example, a music video or movie, or part of a music video or movie—or to supplemental content, such as a commercial advertisement displayed at the beginning (pre-roll), during (mid-roll), or at the end (post-roll) of the presentation of primary content. The periods may be further divided into segments, which may be subdivided into subsegments. The segments or subsegments of each period are sequentially presented to the user to complete a full presentation.

Based on the information in the manifest, in block 42, a first part of media content, or depended content, is requested from the content server. A second part of media content, or dependent content, has a dependency relationship with the depended content. In an embodiment, the dependency relationship can be signaled within the period containing the dependent content, for example, by the attribute "@accessDependency" in the descriptor defined above. Ideally, in order to retrieve, process and present the dependent content, a client system must first retrieve, process and present the depended content. Thus, for example, the client system may be required to present supplemental content, such as a commercial advertisement, in the form of depended content before being allowed access to the related primary content, such as a movie.

Then, in block 44, the first part of media content, or depended content, is delivered by and received from the content server for decoding and display. Authorization is requested, in block 46, to access the second part of media content, or dependent content. The authorization request includes an identifier that specifies the requested dependent content.

Optionally, in block 48, a challenge regarding retrieval, processing or presentation of the depended content is received from the authorization server. For example, the challenge may take the form of an inquiry regarding of the depended content, such as a question about some characteristic of the depended content, such as the size of the file(s) containing the depended content, a partial bitstream from a specified location in the depended content, or the result of an algorithm performed on part or all of the depended content. In an alternative embodiment, the authorization server is not visible to the client device, and the challenge is received by way of the content server.

In response to the challenge, or in the absence of any challenge, the requested evidence is submitted to the authorization server, in block 50. The required evidence may be related, for example, to one or more specific characteristics of the depended content in whole or in part. In an alternative embodiment, evidence that the depended content has been retrieved, processed or presented is submitted together with the authorization request. In this case, the challenge is not required. The substance and form of the submitted evidence must be specified in advance in such an alternative embodiment.

If the submitted evidence is satisfactory, for example, if the evidence meets some requirement imposed by the authorization server, then some representation of authorization to access the second part of the media content, or dependent content, is received from the authorization server in block 52. For example, an access token may be received that will be recognized by the content server to grant access to the dependent content.

Using the representation of authorization, such as an access token received from the authorization server, the second part of media content, or dependent content, is requested from the content server in block 54. If the submitted representation of authorization is accepted by the content server, for example, if the content server verifies that the access token or other representation of authorization meets a specification of the content server, then in block 56 the depended content is delivered by and received from the content server for decoding and display.

In block 58, a determination is made regarding whether or not more parts of media content remain to be delivered. For example, the MPD may be further parsed, or a state record maintained by either the client device or the content server may be consulted, to determine whether or not additional segments of depended or dependent content pertaining to the presentation have yet to be delivered. If so, then the process continues at block 46. Otherwise, if it is determined that no more parts of media content remain to be delivered, then the process ends.

The process of FIG. 3 may be employed to control client access to dependent content. For example, client access to dependent content may be allowed only in the case that the first part of the content has been retrieved and processed in a certain manner. For example, in order to ensure that the first part of the content is used as expected, the client may be required to provide evidence demonstrating that certain processing or action, such as decoding or playback, has been completed with regard to the depended content. The process of FIG. 3 can verify that the client has processed the depended content as the content provider intended, which can serve the purpose of blocking a client that has not processed the depended content from accessing the dependent content.

This approach can advantageously offer flexibility in control policy. For example, different characteristic data produced or generated at different steps of client processing of received content can be required as evidence of processing the depended content. The temporal relationship between generation of the evidence type and the request for the dependent content can also differ. Thus, a service provider can choose a particular type of evidence in order to enforce a desired level or strictness of verification. For example, in various embodiments, a client can be required to present a specified part of the depended content, such as the first several minutes of the presentation, any part(s) of the presentation totaling a specified amount of time, or the entire presentation. In some embodiments, the required parts are selected randomly, which may suffice to prevent a client from skipping any part in the presentation, since the client does not know in advance for which parts evidence will be requested.

Figure 4:
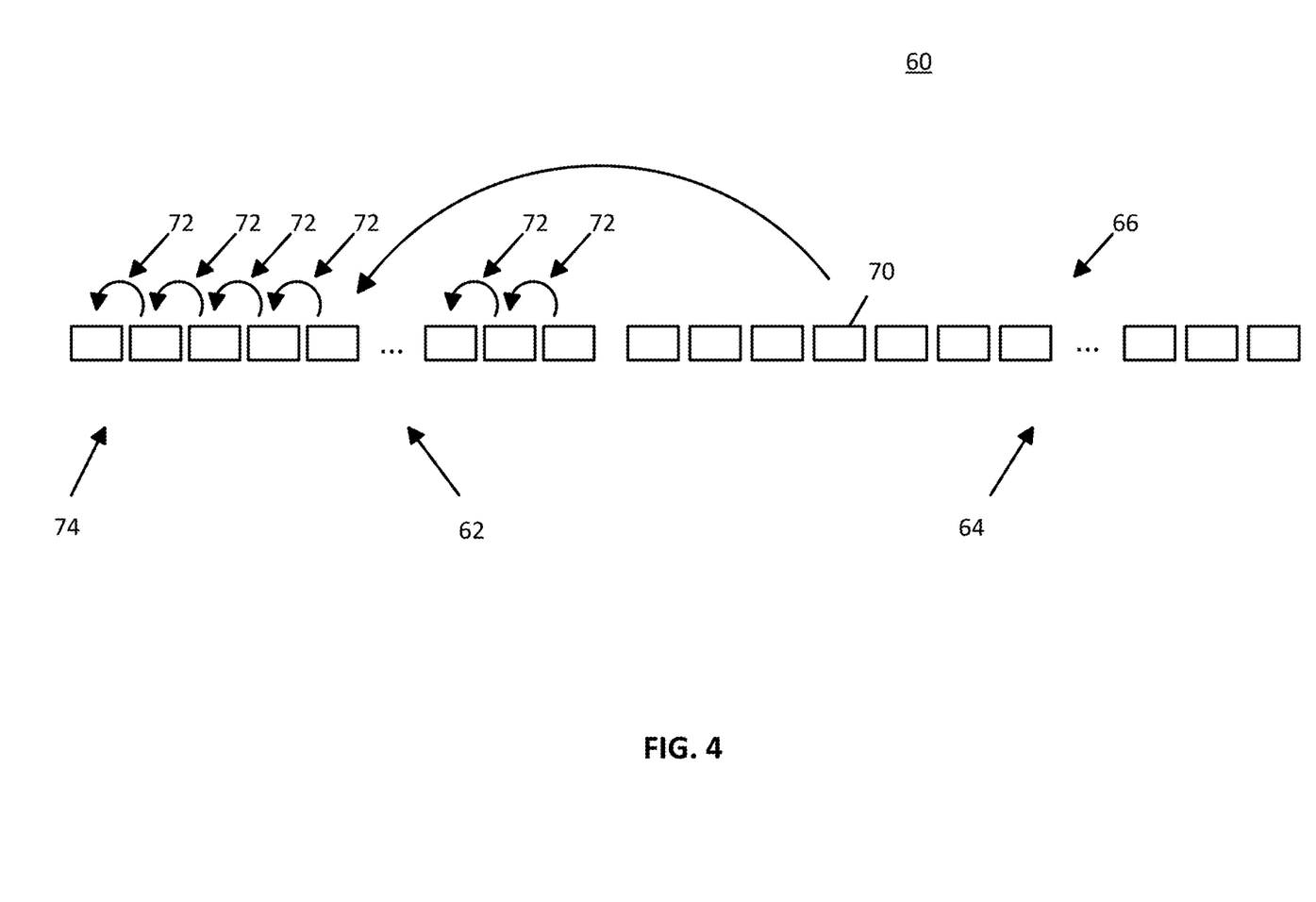
FIG. 4 is an illustration of an exemplary streaming multimedia presentation for use with the adaptive media streaming system of FIG. 1.

For example, referring to FIG. 4, an exemplary multimedia presentation 60 is depicted. The presentation 60 consists of a first part, period 'A' 62, and a second part, period 'B' 64. Period 'A' is a section of depended content, such as a commercial advertisement, that is required to be retrieved and processed before access will be granted to period 'B,' a section of dependent content. The periods are subdivided into segments 66, for example, individual files, of digital multimedia content. In various embodiments, the segments 66 can be further subdivided into subsegments in accordance with the multimedia delivery format or protocol, such as MPEG-DASH.

In one embodiment, a dependency relationship 68 is defined between a dependent content segment 70 and the depended content of period 'A' 62. In this case, the client must submit evidence that a specified portion of depended content in period 'A' 62 of the presentation has been processed, for example, before access is granted to the dependent content segment 70. In another embodiment, sequential dependency relationships 72 are defined between the second segment and the first segment of period 'A' 62, and between each subsequent segment of period 'A' 62 and the immediately previous segment. In this case, the client must submit evidence that each previous segment of period 'A' has been retrieved, for example, before access is granted to the immediately following segment.

As a specific example, period 'A' 62 contains a 30-second advertisement divided into 10 segments 74 of equal length (3 seconds per segment). In one embodiment, the client is required to retrieve or process at least the first 5 seconds of period 'A' before access will be granted to the content of period 'B' 64. In this case, a challenge requesting evidence corresponding to the first two segments 74 of period 'A' 62 is issued to the client, and the client must submit evidence regarding the retrieval or processing of the first two segments 74 of period 'A' 62.

In another embodiment, the client is required to retrieve or process at least 5 seconds of period 'A' 62. In this case, a challenge requesting evidence corresponding to each segment 74 of period 'A' 62 is issued to the client, and the client must submit evidence regarding the retrieval or processing of at least two consecutive segments 74 of period 'A' 62.

In yet another embodiment, the client is required to retrieve or process the entirety of period 'A' before access will be granted to any content of period 'B' 64. In this case, a challenge requesting evidence corresponding to each segment 74 of period 'A' 62 is issued to the client, and the client must submit evidence regarding the retrieval or processing of each and every segment 74 of period 'A' 62.

Nonetheless, even in the case that a client passes an authorization challenge, it is possible that the client has only retrieved the depended content but not actually processed it, or that the client has decoded the depended content but not actually presented it as intended by the content provider. For example, the client device may maintain a buffer large enough to contain the entire depended content after decoding it, and discard the depended content without playing it back after receiving access authorization with regard to the dependent content.

The process of FIG. 3 may be employed to enforce a buffering pace control to inhibit this type of undesired client behavior. For example, after a first part has been accessed by the client, a minimum waiting time can be enforced before the client is permitted to access the subsequent part. That is, the content can be controlled such that it can only be accessed in time intervals on a part by part basis in sequence. This process can substantially restrict the amount of media data that can be accumulated in the client buffer.

In an embodiment, the proper time interval can take continuity of playback into consideration, limiting the maximum effective time interval. For example, requiring a client to wait during an interval of time after accessing a preceding segment before requesting a subsequent segment restricts the client from buffering too much content. However, if the time interval is too long, the client buffer will be empty and the presentation will be interrupted. Thus, the imposition of a maximum waiting period can avoid.

Thus, in some embodiments, the access token does not take effective immediately, but rather becomes valid only after a specified waiting time period. In this case, each part of the content can be accessed only after the specified waiting time period has passed since the previous part of the content was accessed. This approach increases the likelihood that the client has presented, or played back, the previous part before the subsequent part is accessed by preventing excessive accumulation of media content in the client buffer.

The evidence required for client behavior, including controlling buffering pace, can vary in different implementations. In some cases, it will suffice to show that the client received a certain part of the content. In this case, the client need not perform complicated processing or computing to obtain the evidence.

For example, in an alternative embodiment, the content server and authorization server functions are combined in a single system, and the representation of authorization for the dependent content is received together with the depended content (essentially combining block 44 and block 52 of FIG. 3). In this case, the authorization request for the dependent content is impliedly included with the initial request for the depended content (essentially combining block 42 and block 46 of FIG. 3) and the delivery of the depended content is impliedly considered as evidence that the depended content has been retrieved, processed or presented (essentially combining block 44 and block 50 of FIG. 3). This alternative method is particularly suited to controlling the amount of delivered content that may be buffered at the client device.

In another alternative embodiment, an optional attribute can be introduced to inform the client the maximum amount of media data that can be buffered. For example, the attribute "@maxBufferTime" can be included in the MPD.

In some embodiments, the process of FIG. 3 can be employed to enforce both authorized access to dependent content (AAtDC) and control of buffering pace (CoBP). For example, different schemes can be applied to depended and dependent content. Thus, for example, control of buffering pace can be enforced in a first period containing depended content, and authorized access to dependent content can be enforced in a second period containing dependent content. That is, access to segments in the first period can be allowed sequentially with an intervening interval, and access to segments in the second period can depend on previous access to segments in the first period. In addition, in some embodiments, two different authorization servers can be used for the two schemes.

Figure 5:
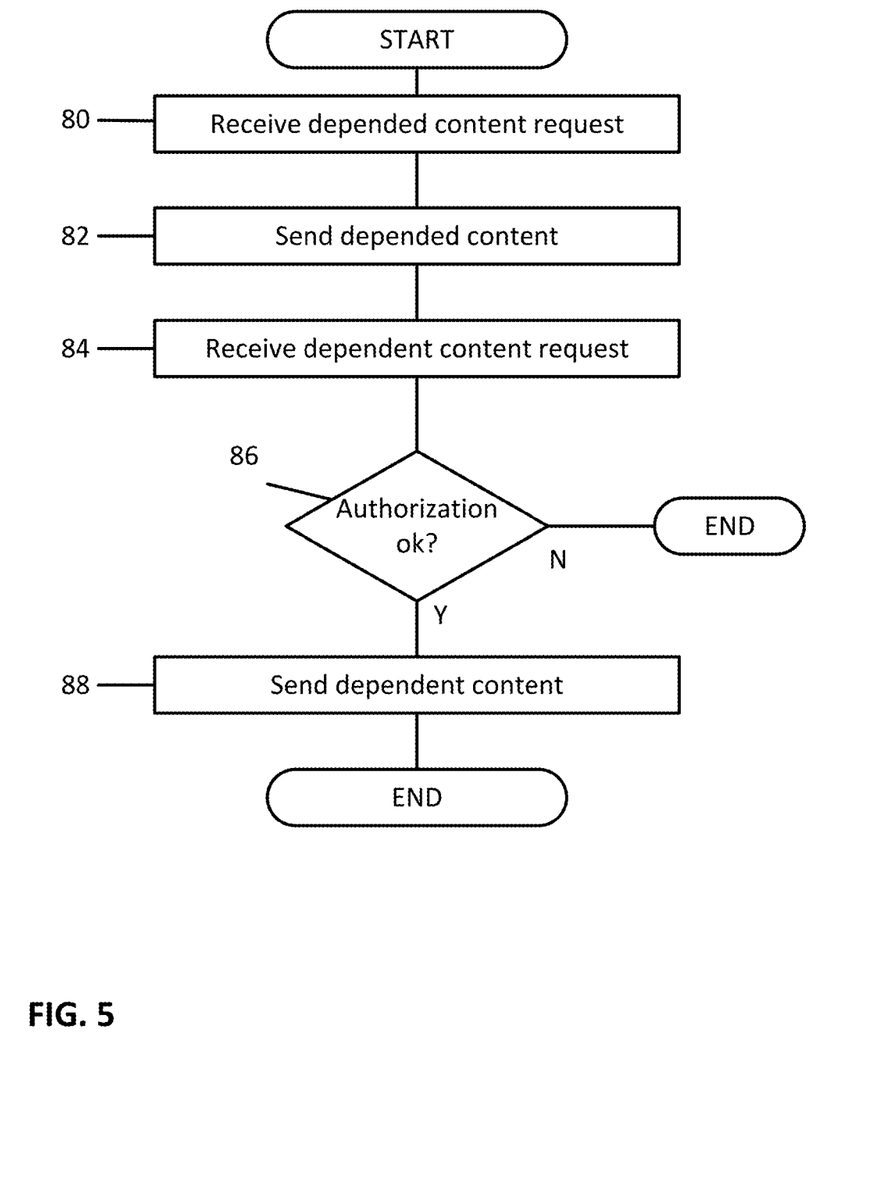
FIG. 5 is a flowchart representing a method of controlling adaptive streaming media access in accordance with an embodiment of the present invention.

Referring now to FIG. 5, an exemplary process flow is illustrated that may be performed, for example, by the content server 12 in the adaptive media streaming system 10 of FIG. 1 to implement the method described in this disclosure for employing an access authorization process in order to prevent a client system from omitting a specified portion of the media content in media streaming. The process begins at block 80, where a request for a first part of media content, or depended content, is received from a client device. A second part of media content, or dependent content, has a dependency relationship with the depended content.

Then, in block 82, the first part of media content, or depended content, is sent or delivered to the client for decoding and display. In block 84, a request for the second part of media content, or dependent content, is received, along with some representation of authorization, for example, an access token. A verification is made, in block 86, regarding whether or not the representation of authorization is acceptable. If so, then the dependent content is delivered or sent, in block 88, to the client for decoding and display. In this approach, the content server does not maintain any record of the current state of the streaming presentation.

Figure 6:
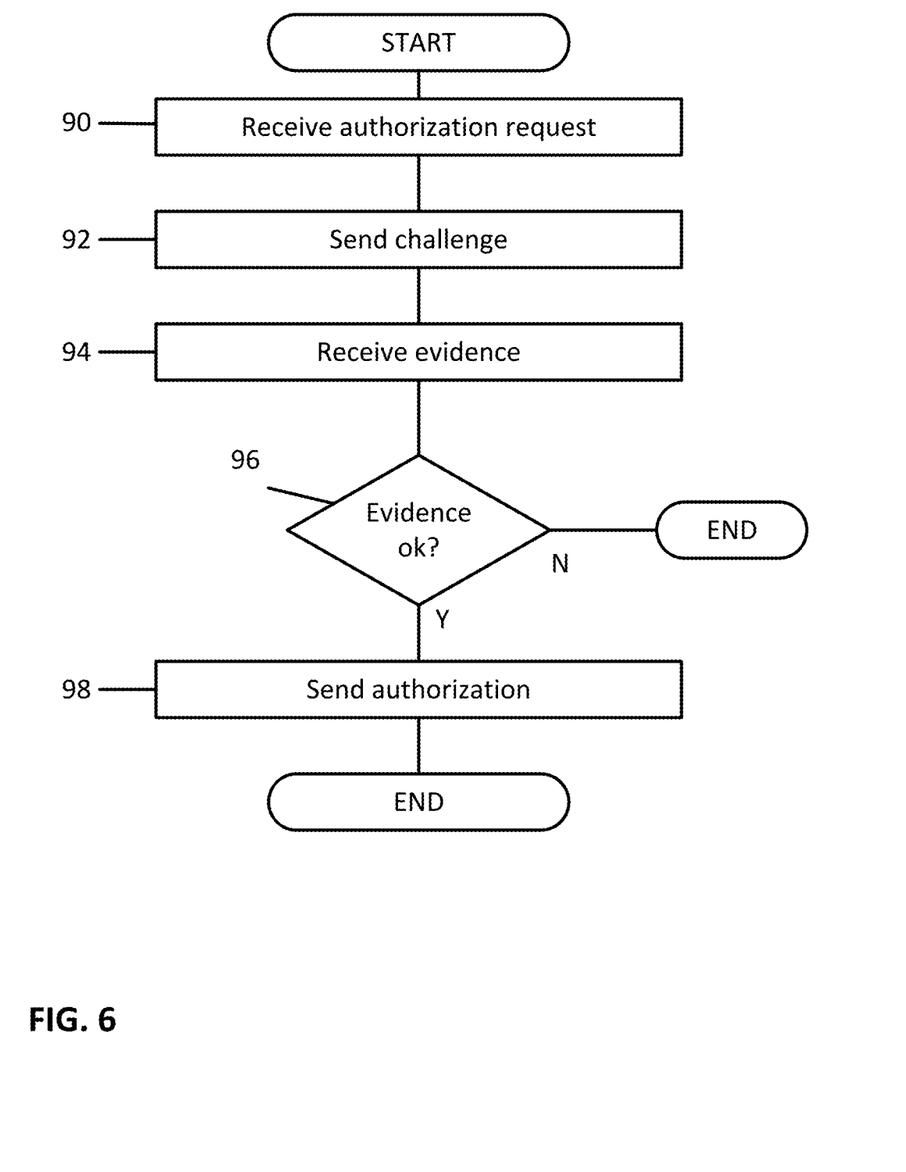
FIG. 6 is a flowchart representing a method of controlling adaptive streaming media access in accordance with an embodiment of the present invention.

Referring now to FIG. 6, an exemplary process flow is illustrated that may be performed, for example, by the authorization server 14 in the adaptive media streaming system 10 of FIG. 1 to implement the method described in this disclosure for employing an access authorization process in order to prevent a client system from omitting a specified portion of the media content in media streaming. The process begins at block 90, where an authorization request to access the second part of media content, or dependent content, is received from the client. The authorization request includes an identifier that specifies the requested content.

Optionally, in block 92, a challenge regarding retrieval, processing or presentation of the depended content is sent to the client. In block 94, evidence regarding the retrieval, processing or presentation of the depended content is received from the client. As suggested above, in an alternative embodiment, evidence that the depended content has been retrieved, processed or presented is received together with the authorization request. In this case, the challenge is not required.

In block 96, a determination is made regarding whether or not the received evidence is satisfactory, for example, if the evidence meets a specified requirement. If so, then a representation of authorization to access the second part of the media content, or dependent content, is sent to the client in block 98 and the process ends with success. Otherwise, if the evidence is not satisfactory, then the process ends with failure. In an alternative embodiment, additional, multiple or new evidence that the depended content has been retrieved, processed or presented may be requested.

As suggested above, in an alternative embodiment, the content server and authorization server functions are combined in a single system, and the representation of authorization for the dependent content is sent to the client together with the depended content (essentially combining block 82 of FIG. 5 and block 98 of FIG. 6). In this case, the authorization request for the dependent content is impliedly included with the initial request for the depended content (essentially combining block 80 of FIG. 5 and block 90 of FIG. 6) and the delivery of the depended content is impliedly considered evidence that the depended content has been retrieved, processed or presented (essentially combining block 82 of FIG. 5 and block 94 of FIG. 6). This alternative method is particularly suited to controlling the amount of delivered content that may be buffered at the client device.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon.

In this respect, any combination of one or more computer readable media may be utilized, including, but not limited to, an electronic, magnetic, optical, electromagnetic, infrared, or semiconductor system, apparatus, or device, or any suitable combination of these. More specific examples of computer readable storage media would include the following non-exhaustive list: a portable computer diskette, a hard disk, a random access memory (RAM), a read-only memory (ROM), an erasable programmable read-only memory (EPROM), a Flash memory, a portable compact disc read-only memory (CD-ROM), an optical storage device, network-attached storage (NAS), a storage area network (SAN), magnetic tape, or any suitable combination of these. In the context of this disclosure, a computer readable storage medium may include any tangible medium that is capable of containing or storing program instructions for use by or in connection with a data processing system, apparatus, or device.

Computer program code for carrying out operations regarding aspects of this disclosure may be written in any combination of one or more programming languages, including object oriented programming languages such as Java, Smalltalk, C++, or the like, as well as conventional procedural programming languages, such as the "C," FORTRAN, COBOL, Pascal, or the like. The program code may execute entirely on an individual personal computer, as a stand-alone software package, partly on a client computer and partly on a remote server computer, entirely on a remote server or computer, or on a cluster of distributed computer nodes. In general, a remote computer, server or cluster of distributed computer nodes may be connected to an individual (user) computer through any type of network, including a local area network (LAN), a wide area network (WAN), an Internet access point, or any combination of these.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. A method for controlling adaptive streaming media access, the method comprising:
   requesting, with a processor, a first portion of media content from a content server,
   submitting evidence to an authorization server that the first portion of media content has been processed by a client device and then presented to a user of the client device, wherein the authorization server and the content server are separate devices;
   receiving a representation of authorization to access a second portion of media content in response to the evidence that the first portion of media content has been received;
   requesting the second portion of media content from the content server;
   presenting the representation of authorization to the content server;
   receiving the second portion of media content in response to the representation of authorization being accepted by the content server; and
   displaying the second portion of media content on a display of the client device.

2. The method of claim 1, wherein the first portion of media content comprises at least part of an advertisement.

3. The method of claim 1, further comprising submitting evidence to the authorization server that the first portion of media content has been processed by the client device.

4. The method of claim 1, further comprising receiving a challenge from the authorization server, wherein the evidence is submitted in response to the challenge.

5. The method of claim 1, wherein the challenge requests evidence correlating to a randomly selected segment of the first portion of media content.

6. The method of claim 1, wherein the representation of authorization comprises a token for accessing the second portion of media content.

7. The method of claim 1, further comprising receiving a manifest that signals a dependency relationship between the first and second portions of media content, identifies the authorization server, and specifies an authorization scheme.

8. The method of claim 1, wherein the second portion immediately follows the first portion in sequence, wherein the sizes of the first and second portions are restricted, and wherein the representation of authorization is accepted by the content server only after a predetermined time interval has passed since the first portion of media content was requested.

9. The method of claim 8, further comprising receiving the first portion of media content with the representation of authorization, wherein the requesting authorization and the submitting evidence are implicit in the requesting the first portion of media content, and wherein the content server and the authorization server are implemented on a single computing device.

10. The method of claim 1, further comprising receiving the first and second portions of media content utilizing a hypertext transfer protocol (HTTP) in compliance with a Moving Picture Expert Group (MPEG) Dynamic Adaptive Streaming over HTTP (MPEG-DASH) standard.

11. The method of claim 10, wherein each of the first portion and the second portion of media content consists one or more MPEG-DASH segments.

12. The method of claim 1, wherein the first portion of media content is requested using a first communication path extending between the content server and the client device, and wherein the evidence submitted to the authorization server is submitted using a second communication path extending between the client device and the authorization server.

13. A method for controlling adaptive streaming media access implemented by an authorization server, the method comprising:
- receiving, with a processor, an authorization request corresponding to a second portion of media content from a client device after the client device has presented to a user of the client device a first portion of edia content received from a content server;
- receiving evidence from the client device that the first portion of media content has been viewed on the client device; and
- sending a representation of authorization to access the second portion of media content available from the content server to the client device in response to the evidence complying with a requirement,
- wherein the authorization server and the content server are separate device.

14. The method of claim 13, wherein the first portion of media content comprises at least part of an advertisement.

15. The method of claim 13, further comprising sending a challenge to the client device, wherein the evidence is received in response to the challenge.

16. The method of claim 13, wherein the representation of authorization comprises a token for accessing the second portion of media content.

17. An apparatus for controlling adaptive streaming media access, the apparatus comprising:
- an authorization server configured to:
  - receive an authorization request corresponding to a second portion of media content from a client device after the client device has presented a first portion of media content to a user of the client device;
  - receive evidence from the client device that the first portion of media content has been viewed on the client device; and
  - send a representation of authorization to access the second portion of media content to the client device in response to the evidence complying with a requirement; and
- a content server configured to:
  - receive a first request from the client device for the first portion of media content, sends the first portion of media content to the client device;
  - receive a second request from the client device for the second portion of media content;
  - receive the representation of authorization to access the second portion of media content from the client device;
  - verify the representation of authorization is acceptable; and
  - send the second portion of media content to the client device,
- wherein the authorization server and the content server are separate devices configured to communicate with the client device over at least partially different communication paths.

18. The apparatus of claim 17, wherein the first portion of media content comprises at least part of an advertisement.

19. The apparatus of claim 17, wherein the content server is further configured to verify the representation of authorization is acceptable only after a predetermined time interval has passed since the first portion of media content was sent to the client device, wherein the second portion of media content immediately follows the first portion of media content in sequence, and wherein the sizes of the first and second portions of media content are restricted.

20. The apparatus of claim 19, wherein a single server comprises the content server and the authorization server, and wherein the single server is further configured to send the representation of authorization to the client device with the first portion of media content.

* * * * *

UNITED STATES PATENT AND TRADEMARK OFFICE
CERTIFICATE OF CORRECTION

| | | |
|---|---|---|
| PATENT NO. | : 9,654,475 B2 | Page 1 of 1 |
| APPLICATION NO. | : 14/595056 | |
| DATED | : May 16, 2017 | |
| INVENTOR(S) | : Shaobo Zhang et al. | |

It is certified that error appears in the above-identified patent and that said Letters Patent is hereby corrected as shown below:

In the Claims

Column 12, Lines 36-38, Claim 5, should read:
5. The method of claim 4, wherein the challenge requests evidence correlating to a randomly selected segment of the first portion of media content.

Column 12, Lines 65-67, Claim 11, should read:
11. The method of claim 10, wherein each of the first portion and the second portion of media content consists of one or more MPEG-DASH segments.

Column 13, Lines 8-25, Claim 13, should read:
13. A method for controlling adaptive streaming media access implemented by an authorization server, the method comprising:
    receiving, with a processor, an authorization request corresponding to a second portion of media content from a client device after the client device has presented to a user of the client device a first portion of media content received from a content server;
    receiving evidence from the client device that the first portion of media content has been viewed on the client device; and
    sending a representation of authorization to access the second portion of media content available from the content server to the client device in response to the evidence complying with a requirement,
    wherein the authorization server and the content server are separate devices.

Signed and Sealed this
Third Day of April, 2018

Andrei Iancu
*Director of the United States Patent and Trademark Office*